May 17, 1932. H. C. PIERCE 1,858,841
REFRIGERATION
Filed June 13, 1928
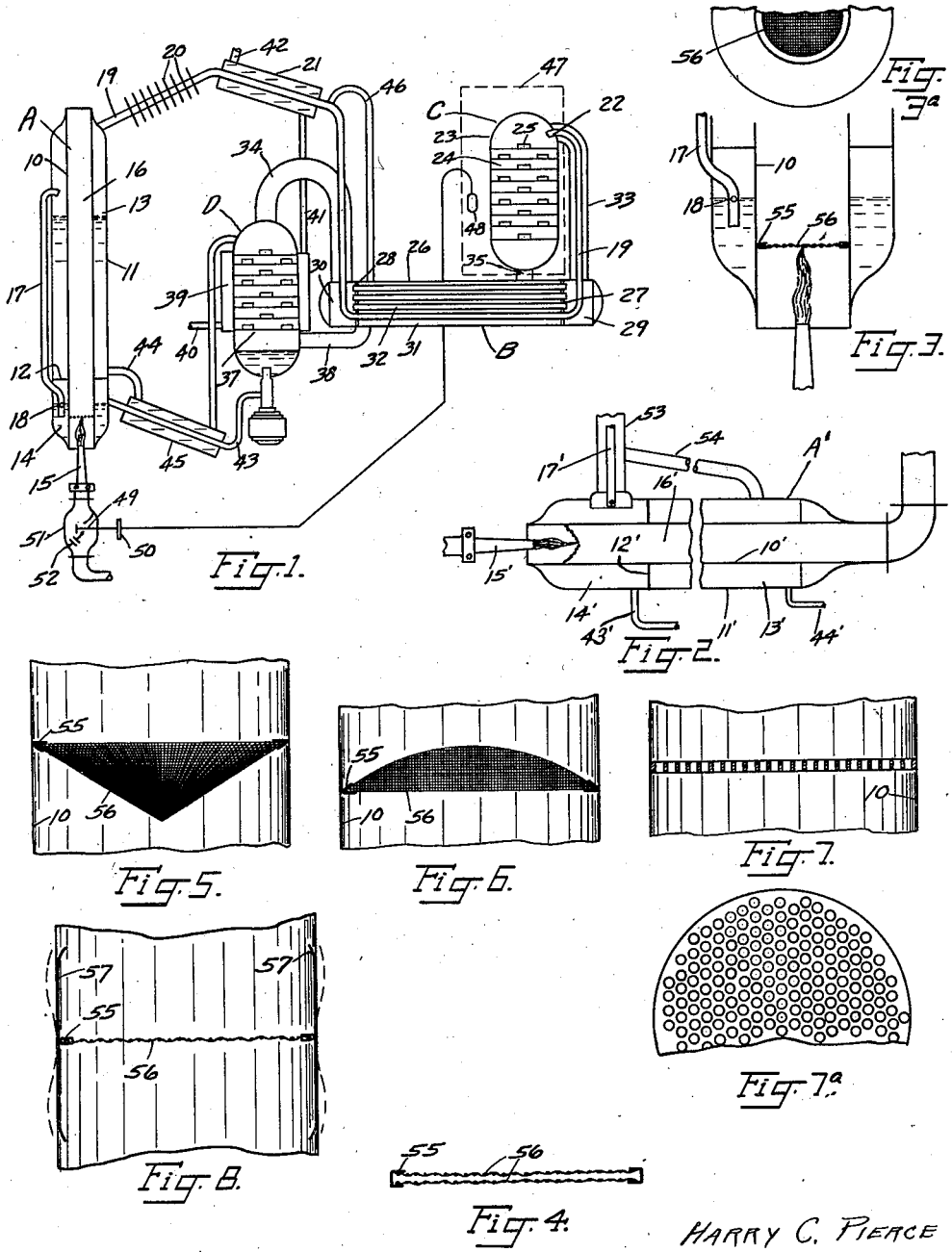
HARRY C. PIERCE
INVENTOR.
BY J.C. Markle
ATTORNEY.

Patented May 17, 1932

1,858,841

UNITED STATES PATENT OFFICE

HARRY C. PIERCE, OF RUTHERFORD, NEW JERSEY, ASSIGNOR TO ELECTROLUX SERVEL CORPORATION, OF NEW YORK, N. Y., A CORPORATION OF DELAWARE

REFRIGERATION

Application filed June 13, 1928. Serial No. 285,002.

My invention relates to the art of refrigeration and has particular reference to refrigerating apparatus of the absorption type in which circulation is secured by forces generated within the system through the application of heat to certain portions thereof. More specifically, the invention relates to apparatus of the above character in which the heat is generated through the medium of a gas or other flame producing burner.

One of the principal objects of the invention is to provide a more efficient transfer of heat to the apparatus in order to secure an increased circulation rate with a given fuel consumption. Another object is to secure an increase in the thermal efficiency of the apparatus as a whole. A still further object is to provide apparatus which will minimize or eliminate production of carbon monoxide gas and other noxious gases and odors caused by improper adjustment of the usual burner employed, and to assure substantially complete combustion under all ordinary operating conditions.

Further and more detailed objects of the invention, as well as the advantages to be derived from its use, will become apparent from a consideration of the ensuing description of illustrative forms of apparatus by means of which the invention may be carried into effect, and by reference to the accompanying drawings forming a part hereof, in which;

Fig. 1 is a diagrammatic view of a gas fired absorption refrigerating system of the Platen-Munters type, having a vertical generator to which the invention has been applied; Fig. 2 is a fragmentary diagrammatic view of a horizontal generator for a system of this type; Figs. 3 and 3a are respectively vertical and horizontal sections on an enlarged scale of a portion of Fig. 1; and Figs. 4 to 8 are enlarged views of other forms of device embodying the invention.

Referring now to the apparatus shown in Fig. 1, A designates the generator, comprising an inner tube 10 and an outer shell 11, which with the partition 12 form upper and lower annular generating chambers 13 and 14. Heat is generated by a suitable burner 15, which in the present instance has been shown as a gas burner of the Bunsen type, and the combustion gases are carried through the flue 16 formed by the tube 10. A tube 17, connects the chamber 14 with the upper portion of chamber 13, and is extended at its lower end to a point below the normal liquid level in chamber 14. An opening 18 is provided in tube 17 at this normal liquid level.

A conduit 19 provided with radiating fins 20 leads from the upper portion of chamber 12 through the water jacket 21, and heat exchanger B to an evaporator C, entering the upper portion of the latter by way of the goose neck 22. The evaporator C consists of a cylindrical shell 23 provided with a plurality of baffles 24, perforated as at 25.

The bottom of evaporator C is connected to heat exchanger B which consists of a shell 26 near the ends of which are located the tube sheets 27 and 28 dividing the shell into end chambers 29 and 30 and an intermediate chamber 31, said chambers being connected by small drain holes in the tube sheets and the end chambers being placed in communication by the tubes 32 secured in sheets 27 and 28.

Chamber 29 is connected to the top of the evaporator C by conduit 33, while chamber 30 is connected to the top of the absorber D by the conduit 34. The pipe 35 connects the bottom of evaporator C and the top of chamber 31.

The absorber D consists of a cylindrical shell 36 provided with a plurality of perforated baffles 37 and the lower end of the shell is connected by pipe 38 with the bottom of chamber 31. A water jacket 39 surrounding the absorber is supplied through pipe 40 and may discharge through pipe 41 to the jacket 21 from which the final discharge is carried by pipe 42.

A pipe 43 connects the bottom of absorber D with a point adjacent to the top of chamber 14, and conduit 44, arranged in heat exchange relation to pipe 43 as at 45, connects the lower end of chamber 13 with the top of absorber D. A gas vent 46 connects the conduit 19 with chamber 31.

The structure just described is not novel and the operation thereof is therefore not given in detail herein as reference may be had to U. S. Patent #1,609,334, granted Dec. 7, 1926, to B. C. von Platen, et al. for a more detailed disclosure of this system.

For a proper understanding of the present invention, it is sufficient to state that heat, applied to the generator A, evaporates a refrigerant, such as ammonia, from an absorbing medium such as water in which it is contained in dissolved form in chamber 13. The ammonia in gaseous form passes through conduit 19, being first cooled by the action of the radiating fins 20, and subsequently liquified by the condensing action of the water jacket 21. The liquid ammonia is delivered to the top of evaporator C where it is diffused in an inert gas, such as hydrogen. This diffusion of the liquid ammonia into gaseous forms produces refrigeration. The mixture of ammonia and hydrogen descends in the evaporator C and passes through the pipe 35, chamber 31 and pipe 38 into the bottom of the absorber D. In the absorber the ammonia is absorbed by the water present therein, while the unabsorbed hydrogen passes through conduit 34, exchanger tubes 32, and conduit 33 to the evaporator C.

The rich solution of ammonia in water passes to the generator chamber 14 where, by the application of heat, liberation of a part of the ammonia takes place. The liberated gaseous ammonia causes a transfer of both refrigerant and absorbing liquid from chamber 14 to chamber 13 by way of the tube 17. For a detailed description of this portion of the apparatus and the theory to which this operation is ascribed, reference may be had to U. S. Patent #1,645,706, granted October 18th, 1927, to Alvar Lenning.

The rate of circulation of refrigerant within the system, and as a corollary, the rate of refrigeration is obviously a function of the amount of heat supplied to the generator. In order to regulate the temperature maintained in the refrigerating chamber 47 in which the evaporator C is located, a thermostat 48 is employed which controls the gas valve 49 through the medium of a diaphragm chamber 50. The valve casing 51 is preferably provided with a small fixed orifice 52, affording a by-pass for supplying a pilot light during periods when the thermostat has operated to close the valve 49.

In Figure 2 a horizontal generator A' for the same type of system is disclosed, comprising a central tube 10', shell 11' and partition 12', forming chambers 13' and 14'. Heat is supplied from burner 15', the combustion gases therefrom being carried off through the flue space 16'. The strong ammonia solution is supplied from the absorber to chamber 14' by conduit 43', while the ammonia-free water from chamber 13' is carried through conduit 44' to the absorber. The perforated tube 17', acting in substantially the same manner as tube 17, serves to carry the rich ammonia solution to the outer tube 53 from which it flows to chamber 13' by way of the connection 54.

In sizes adapted to domestic use, for which the system above described is particularly suitable, the generator is relatively small, i. e., the length of the tube 10 is for example from 1 to 2 feet. Furthermore, the rate of fuel consumption necessary to produce the required amount of refrigeration is relatively low, so that only a relatively small flame is required. In order to secure complete combustion within the portion of the flue within the generator, it is necessary to use a burner which will produce some form of so-called "blue" flame, such as that produced by a Bunsen burner. Combustion of this character gives off comparatively little radiant heat so that in prior forms of refrigerating apparatus of this character substantially all of the heat transferred to the generator has been by convection.

Furthermore, the small flame required makes delicate adjustment necessary in order to secure proper combustion, and the apparatus is of a character such that it is difficult to keep the proper adjustment over a long period of time. Unless the burner is properly adjusted the resultant imperfect combustion in the relatively small flue 16 is likely to cause the generation of carbon monoxide gas as well as other noxious gases and undesirable odors. Inasmuch as the majority of refrigerating machines of the character described are in domestic use, usually in a kitchen, the production of such fumes and gases, particularly carbon monoxide gas may have serious if not dangerous consequences.

In prior forms of apparatus of this character, various types of baffles have been utilized in the flue 16 in order to assure complete combustion and an efficient rate of heat transfer to the generator chambers. These baffles are, however, not able to effect complete combustion when the burner is not properly adjusted.

I have found that the usual trouble encountered in obtaining and maintaining proper combustion in generators of this type can be eliminated by inserting within the flue 16 above the burner a device which will be heated to incandescence by the burner. This device may take a variety of specific forms, the salient feature of the device in all cases, however, being the provision of a foraminous structure of some material adapted to withstand destructive oxidation when held at high temperatures for long periods of time, this structure being located in the flue in a position where it will be heated to incandescence when the burner is in operation, and preferably, though not necessarily, located in the portion of the flue passing through the chamber 14. It is also highly desirable that the form of the device be such that all of the gases of combustion pass through it.

One satisfactory form of the device may be such as that shown in Figure 3, comprising a retaining ring 55 which holds a wire mesh screen 56, made of some form of non-oxidizing wire, such as nichrome or platinum. This screen is preferably located so that the tip of the flame from the burner comes in contact with the screen and maintains the latter in a state of incandescence, although this exact location is not essential as the temperature of the combustion gases in the zone of such a flame is sufficient to permit some variation in the position of the screen. Obviously, a screen of this character need not be confined to one layer but may, as is shown in Figure 4, be formed of a number of layers of wire mesh.

The gauge of wire employed in the screen and the number of wires per inch in the mesh employed may vary between wide limits, depending upon the individual installation. I have found by experiment, however, that a device of this character made of three layers of wire mesh screen formed of No. 30 Brown & Sharpe gauge wire, spaced 16 to the inch, produces a marked effect on the action of the refrigerating apparatus. With a burner properly adjusted a screen of this character inserted in a baffled flue just above the burner frame produced a drop in the flue gas temperature at the exit end of the generator of 40° F. and also produced a drop of 3° F. in the food chamber of a refrigerator adjacent to the chamber in which the evaporator C was located.

While it is to be understood that I do not desire to be bound by such a theory, it is my belief that the improvement in the action of the refrigerator, due to the application of my invention, is caused by the following action. It is a known fact that the rate of heat transmission through a wall to a liquid is more rapid when the heat applied to said wall is radiant in character than when the heat transmission is by convection. In accordance with my invention, a certain proportion of the heat which ordinarily is absorbed only by convection is converted into radiant heat within the flue and this radiant heat, being more rapidly absorbed by the flue walls, causes the total transfer of heat to the generator to be increased, so that the amount of heat remaining in the gases leaving the flue is reduced, thereby raising the overall thermal efficiency. Furthermore, the production of a zone of radiant heat within the chamber 14 increases the proportion of the total amount of heat which is transmitted to this chamber and as a result accelerates the circulation effected by increasing the amount of evaporation within the chamber 14. The increased circulation rate results in a greater amount of refrigeration for a given fuel consumption, and it is possible that the efficiency of the refrigerating system might also be further increased by reducing the amount of absorbing medium employed, such production being made possible because of the increase in the rate of circulation.

In addition to its effect upon the heat absorption by the generator, the radiant screen also improves combustion as it will be obvious that any unconsumed gases leaving the burner due to misadjustment of the latter will be ignited upon passing through this screen. This will in effect produce secondary combustion when the burner is improperly adjusted and will assure the complete combustion of all gases leaving the burner, thereby eliminating the possibility of the escape of carbon monoxide or other noxious fumes or odors from the flue 16.

While the screen shown in Figure 1 is illustrated as a plane surface, it will be obvious that if desired the screen can be made as a conical or partly spherical surface as shown in Figures 5 and 6. It will also be apparent that a refractory material, rather than a metallic material, may be used and this refactory material may take either the form of a fine wire, such as is employed in making the metallic screens, or it may be in the form of a foraminous disc, or button, as is shown in Figs. 7 and 7a. Obviously the shape is subject to variation.

When constructed either as a mesh screen or as a perforated plate, the size and number of the holes, or perforations, must be sufficient to allow passage of the combustion gases without too great a draft loss. In this connection it may be pointed out that the device, in addition to producing radiant heat, also acts, to some extent, as a baffle near the burner, tending to produce more intimate contact between the gases and the generator wall below the screen, and thus additionally increasing the rate of heat transfer at this point.

The device may be secured to the tube 10 in any desired manner and where it is permanently secured to the tubes, the retaining ring 55 may be omitted. For example: The wire mesh screen may be spot-welded directly to the inner face of the tube. The screen may readily be made in any of its forms as a detachable unit adapted to be added to a completed machine. In Fig. 8 I have shown one form of such a device, in which the ring 55 has secured thereto at opposite side the spring friction members 57, the normal contour of which is shown in dotted lines. When placed within the tube 10, the spring members assume the position shown in full lines and hold the screen 56 in position by frictional contact with the tube. The spring members 57 need not necessarily be made of a non-oxidizing material, as they will be maintained at a point below incandescence by the cooling effect of the tube 10. In this connection it is to be noted that with this form, an additional heating effect is secured by the transfer of heat by conduction from the screen 56 by way of the ring 55 to the spring members 57 and to the tube 10. Such transfer by conduction may also take place directly from the ring 55 or from the screen itself to the tube 10 in cases where the spring members 57 are not used.

Support of the device from the burner may also readily be effected.

Any of the forms of the device just described may be applied to a horizontal generator, such as is shown in Fig. 2, but because of the natural tendency of the gases to follow the top of the horizontal flue 16', it is to be expected that the best results will be obtained if some form of screen is used which will tend to direct the maximum amount of radiant heat downwardly against the lower portion of the flue wall.

A coating of some material such as thorium nitrate may be employed on the device to enhance the radiating effect and to assure incandenscence at reduced temperatures.

It will be obvious that the auxiliary generator chamber may be of the coil type shown in U. S. Pat. No. 1,609,334.

While the invention has been described and illustrated as applied to a specific absorption refrigerating system operated by a Bunsen flame, it is to be understood that it is not to be limited to use solely with this specific apparatus, but may be applied to other devices of the same general character. It is likewise to be understood that the invention includes all such forms as may fall within the scope of the appended claims.

I claim:

1. That improvement in the art of refrigerating by the aid of an absorption system including a bi-chambered generator which consists in causing vaporization and flow of the refrigerant and absorption liquid by the application of heat to one chamber, causing vaporization and flow of the refrigerant by the application of heat to the other chamber, and modifying the normal heat transfer to the chambers by increasing the amount of radiant heat generated in the vicinity of and applied to first-mentioned chamber.

2. An absorption refrigerating system comprising a generator, a condenser, an evaporator, an absorber and conduits connecting said generator, condenser, evaporator and absorber including conduits for circulating an inert gas between and through said evaporator and said absorber, said generator comprising a main chamber and an auxiliary circulating chamber and having a flue extending through both said chambers, a burner located adjacent to one end of the flue and heat radiating means located in the flue and adapted to be heated to incandescence by heat from the burner, said heat radiating means being arranged so that the major portion of the radiant heat therefrom is directed against the wall of one of said chambers.

3. An absorption refrigerating system comprising a generator, a condenser, an evaporator, an absorber and conduits connecting said generator, condenser, evaporator and absorber including conduits for circulating an inert gas between and through the evaporator and absorber, said generator comprising a main chamber and an auxiliary circulating chamber and having a flue extending through both said chambers, a burner located adjacent to the auxiliary circulating chamber end of a said flue and foraminous material located in said flue beyond said burner with reference to the direction of flow of products of combustion and adjacent said auxiliary circulating chamber, said material being of such nature and so arranged as to be heated to incandescence by contact with the burner flame and to produce secondary combustion of any unconsumed gases leaving the burner.

4. An absorption refrigerating system comprising a generator, a condenser, an evaporator, an absorber and conduits connecting said generator, condenser evaporator and absorber including conduits for circulating an inert gas between and through the evaporator and absorber, said generator comprising a main chamber and an auxiliary circulating chamber and having a flue extending through both said chambers, a burner located adjacent to the auxiliary circulating chamber end of said flue and foraminous radiating means located in the part of the flue within the auxiliary circulating chamber, said foraminous means being adapted to be heated to incandescence by heat from said burner.

5. An absorption refrigerating system comprising a generator, a condenser, an evaporator, an absorber and conduits connecting said generator, condenser, evaporator and absorber including conduits for circulating an inert gas between and through said evaporator and absorber, said generator comprising a main chamber and an auxiliary circulating chamber and having a flue extending through both said chambers, said system including means to produce flow of absorption liquid from said auxiliary circulating chamber to said main chamber due to heat applied to the auxiliary chamber, means to produce flow of refrigerant from said main chamber to said condenser due to heat applied to the main chamber, a burner arranged to heat both of said chambers and means in said flue to proportion the amounts of heat received respectively by said chambers.

6. An absorption refrigerating system comprising a generator, a condenser, an evaporator, an absorber and conduits connecting said generator, condenser, evaporator and absorber, said generator comprising a main vaporizing part and a thermosiphon flow-producing vaporizing part and a flue for heating both said parts, a burner located adjacent to one end of the flue and heat radiating means located in the flue and adapted to be heated to incandescence by heat from the burner, said heat radiating means being arranged so that the major portion of the radiant heat therefrom serves to heat one of said generator parts.

In witness whereof I have hereunder affixed my signature.

HARRY C. PIERCE.